Aug. 12, 1947.  C. A. ELLIS  2,425,522
HEADSUPPORTED BINOCULAR MAGNIFIER
Filed Dec. 18, 1943
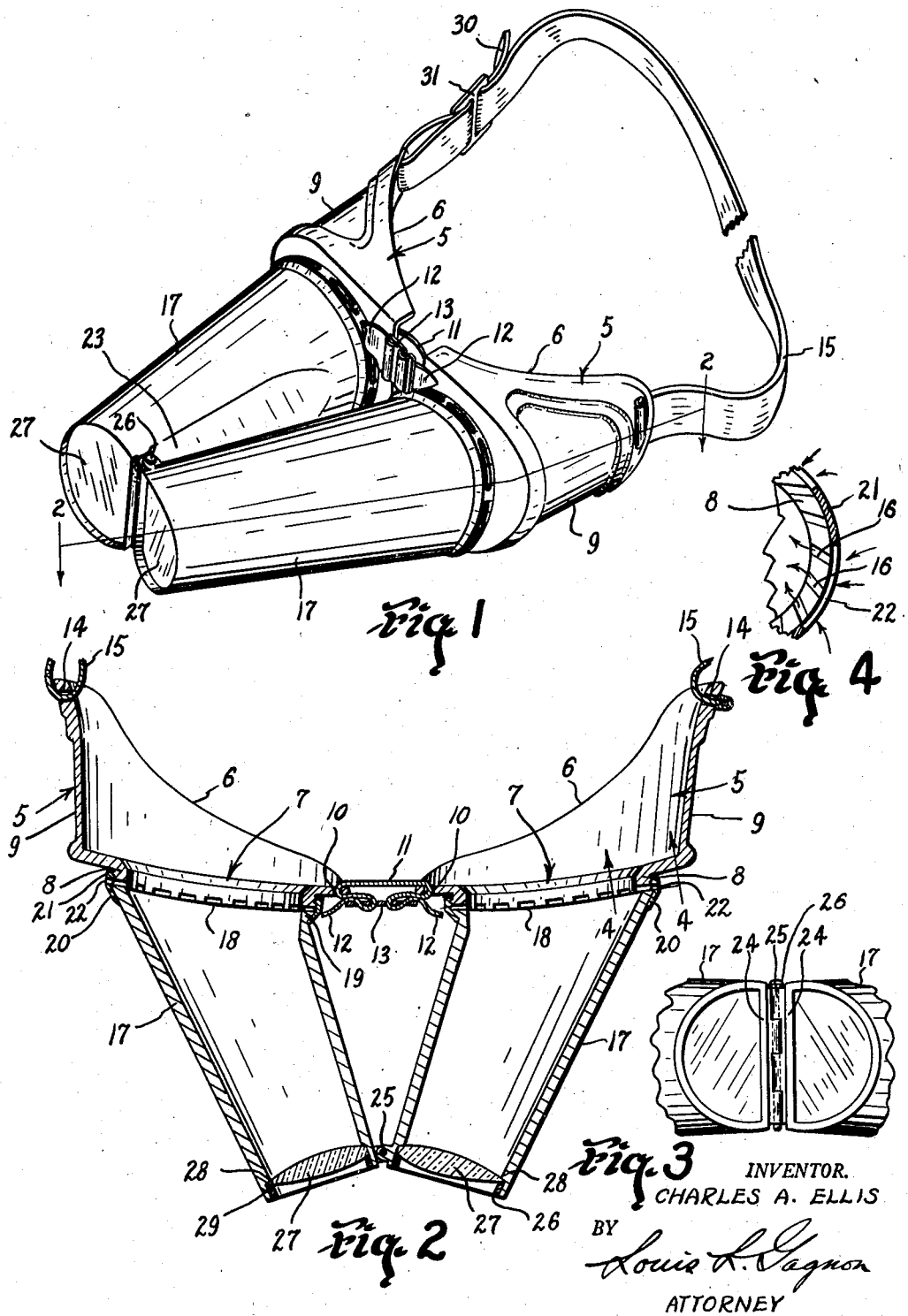
INVENTOR.
CHARLES A. ELLIS
BY
Louis L. Gagnon
ATTORNEY Patented Aug. 12, 1947

2,425,522

UNITED STATES PATENT OFFICE 2,425,522

HEAD-SUPPORTED BINOCULAR MAGNIFIER

Charles A. Ellis, Southbridge, Mass., assignor to American Optical Company, Southbridge, Mass., a voluntary association of Massachusetts Application December 18, 1943, Serial No. 514,773

5 Claims. (Cl. 88—41)

This invention relates to improvements in binocular magnifiers and relates particularly to novel structural means.

One of the principal objects of the invention is to provide a binocular magnifier which is formed of a material which is light in weight, having face engaging portion shaped to the general facial characteristics of most individuals and which are adjustable relative to the magnifying units whereby a proper fit with a particular individual may be obtained.

Another object is to provide a binocular magnifier of the type having angularly related sight tubes with enlarged eye cup portions to which the tubes are adjustably connected and having face engaging edge portions shaped substantially to the general facial configurations of most individuals whereby a more comfortable fit of said binocular magnifier may be obtained with a less confining effect on the individual.

Another object is to provide a binocular magnifier of the above character having ventilation means therein.

Another object is to provide a binocular magnifier in which the adjustable face engaging portions may be adjusted to conform to the contour of the face about the eyes by tilting or rotating said face engaging portions without affecting the relation of the sight tubes supporting the magnifying units.

Another object is to provide a binocular magnifier of the above character which may be worn with ordinary spectacles.

Another object is to provide parts which may be quickly and easily molded to the shapes desired and which may be quickly and easily assembled.

Another object is to provide an arrangement whereby the plane of the magnifying lenses will be substantially normal to the line of sight at different positions of adjustment.

Other objects and advantages will become apparent from the following description taken in connection with the accompanying drawings and it will be apparent that many changes may be made in the details of construction and arrangement of parts shown and described without departing from the spirit of the invention as expressed in the accompanying claims.

I, therefore, do not wish to be limited to the exact details of construction and arrangements shown and described as the preferred forms only have been given by way of illustration.

Referring to the drawings:

Fig. 1 is a perspective view of the binocular magnifier embodying the invention;

Fig. 2 is a sectional view as taken on line 2—2 of Fig. 1 looking in the direction indicated by the arrows;

Fig. 3 is a fragmentary front view of the device; and

Fig. 4 is a fragmentary sectional view taken as on line 4—4 of Fig. 2 illustrating the characteristics of the ventilating means.

Binocular magnifiers are not new in the art. Most prior art magnifiers, however, have been of such construction that the portions surrounding the respective eyes were in rigid relation with each other and could not readily conform to the different facial requirements of different individuals. Such magnifiers introduced difficulty in some instances of leakage of light about the contour edges due to improper fit with the face. Such improper fitting also introduced considerable discomfort to the wearer and further discomfort was introduced through lack of ventilation and in most instances the characteristics of such prior art binocular magnifiers were such as to introduce an exceedingly confining effect on the wearer.

It is, therefore, one of the primary objects of this invention to provide a binocular magnifier which will overcome all of the above difficulties in addition to enabling said magnifier to be economically manufactured whereby the means of assembly will permit the face engaging portions of the magnifier to be adjusted to the facial requirements of different individuals and also provide ventilation means.

Referring more particularly to the drawings wherein like characters of reference designate like parts throughout the several views, the device embodying the invention comprises a pair of eye cups 5, each of which are provided with a rear edge portion 6 shaped to the general facial characteristics of most individuals and each having openings 7 surrounded by threaded attachment means 8. The said eye cups 5 are each provided with a solid side wall 9 spaced outwardly of the outer limits of the openings 7 an amount sufficient to reduce the confining effect of the device when in position of use and to provide clearance to fit over ordinary spectacles. The said eye cups 5 are each provided, adjacent the nasal sides thereof, with vertical slots 10 to which the bridge member 11, in the form of a strap-like member may be threadedly connected. The strap-like connecting member 11 has its respective end portions 12 adjustably connected with a buckle-like joining member 13. The said member 13 is provided with spaced slots through which the respective ends 12 are threaded as shown in Fig. 2. It is to be noted that by proper adjustment of the length of the strap-like member 11, intermediate the slots 10, the distance between the eye cups may be properly controlled. The said eye cups 5, adjacent the temporal sides thereof, are each provided with slot-like connection means 14 to which a suitable headband or the like 15 may be threadedly connected as shown best in Figs. 1 and 2.

The attachment means 8 is preferably in the form of an annular flange-like member having its outer side surface threaded and having its front edge provided with a plurality of spaced slots 16, see Figs. 2 and 4. The said slots 16 are formed to such an angle that light travelling in the direction of lines radial with the center of the attachment means 8 will be shunted by the overlap of the inner and outer edges of the respective walls of the slots. This will permit air to enter the eye cups with the light being directed away from the eyes and will prevent dust, dirt, etc., from directly reaching the eyes. The said outer slotted edge of the attachment means 8 provides a seat for receiving the sight tubes 17. The said sight tubes 17 are preferably formed of moldable plastic material similar to the material of the eye cups and may be formed to any shape desired. The said tubes in the present instance are preferably of the shape of a frustum of a cone having their rear edge portions 18, which engage the front seat of the attachment means 8, angled with respect to the longitudinal axis of the sight tubes 17 so as to permit the forward ends of the sight tubes 17 to converge towards each other. The said sight tubes 17, adjacent the edges 18, are each provided with an outer tapered flange 19 adapted to be engaged by the tapered portion 20 of a threaded retaining ring 21. The said retaining rings 21 are each provided with a plurality of longitudinal slots 22 adapted to communicate with the angled slots 16. The said retaining rings are each provided with internally threaded portions by means of which the said rings may be threadedly attached to the attachment means 8. The tapered portions 20 are adapted to draw the edges 18 into intimate relation with the front seat portion of the attachment means 8.

The sight tubes 17, adjacent the inner forward ends, are each provided with a flattened area 23 causing the said sight tubes to have substantially parallel meeting edges 24. The said edges 24 are connected with each other through a suitable hinge 25. The said hinge 25 is provided with a removable hinge pintle 26.

The forward ends of the sight tubes 17 are each provided with a suitable magnifying lens 27 held in engagement with a shouldered seat 28 internally of the respective sight tubes 17 by means of a friction collar or the like 29. The lenses 27 are shaped to the contour shape of the forward ends of the respective tubes as shown in Fig. 3.

It is to be noted that the hinge member 25 is such that the sight tubes 17 may be only adjusted relative to each other in a horizontal plane.

The eye cups 5, through the hinge connection 25 and adjustable strap-like bridge member 11, may be altered as to the distance between the centers of the openings 7 to meet the pupillary requirements of different individuals. The retaining rings 21, during the adjustments of the eye cups 5 to the facial requirements of a particular individual, are preferably loosened so as to permit the eye cups to be tilted or rotated with respect to each other whereby the face contacting edge 6 may be properly fitted with the face. It is to be understood, of course, that the adjustment of the strap-like bridge member 11 is such as to provide the proper distance between the eye cups for obtaining a comfortable fit with the face. The flexibility of the bridge member being such as to permit twisting or rotary movement of the eye cups while retaining the proper spaced relation thereof.

The headband 15 is of the commonly known adjustable type having an end portion 30 threaded through a suitable buckle 31 and is preferably adjusted so as to comfortably retain the device on the face of the wearer.

After the eye cups have been properly adjusted to fit the face of the wearer, as set forth above, the retaining rings 21 are then preferably tightened to hold the parts in rigid relation with each other. After having once been adjusted to the requirements of a particular individual the binocular magnifier is adapted for continued use by said individual without further adjustment.

Due to the fact that the eye cups 5 and the sight tubes 17 are formed of moldable plastic materials the said device will be exceedingly light in weight and comfortable.

The eye cups 5, as previously stated above, are greatly increased in diameter beyond the diameter of the inner ends of the sight tubes 17 whereby a less confining effect will be experienced by the wearer and a greater area of circulation of air internally of the eye cups and through the ventilation slots 16 and 22, respectively, may be obtained. This affords greater comfort during the use of the device and also permits the wearer to retain the use of his spectacles.

It is to be noted that the inner ends of the sight tubes 17 which engage the attachment means 8 and the said attachment means are circular in contour so as to permit rotation of the eye cups 5 relative to the sight tubes during the adjustment of the eye cups to the facial requirements of the wearer.

From the foregoing description it will be seen that simple, efficient and economical means have been provided for accomplishing all of the objects and advantages of the invention.

Having described my invention, I claim:

1. A device of the character described comprising a pair of eye cups having edge portions shaped to fit the face and sight openings therein with connection means adjacent said sight openings, said connection means having a supporting edge portion with spaced recesses therein, a pair of tubular members each having an edge portion shaped to engage the supporting edge portion of the connection means of the respective eye cups, means secured to the connection means of the respective eye cups for securing said tubular members to said eye cups, said means having openings therein communicating with the spaced recesses in the supporting edge portions of the eye cups and means for adjustably altering the relation of the tubular members and eye cups.

2. A device of the character described comprising a pair of eye cups having edge portions shaped to fit the face and sight openings therein with connection means adjacent said sight openings, said connection means having a supporting edge portion with spaced recesses therein, a pair of tubular members each having an edge portion shaped to engage the supporting edge portion of the connection means of the respective eye cups, means secured to the connection means of the respective eye cups for securing said tubular members to said eye cups, said means having openings therein communicating with the spaced recesses in the supporting edge portions of the eye cups and means adjacent the forward ends of the tubular members hingedly connecting said tubular members together and adjustable means connecting the eye cups together whereby the angular relation of the tubular members may be altered and the spaced relation of the eye cups may be altered.

3. A device of the character described comprising a pair of eye cups having edge portions shaped to fit the face and sight openings therein with connection means adjacent said sight openings, said connection means having a supporting edge portion with spaced recesses therein, a pair of tubular members each having an edge portion shaped to engage the supporting edge portion of the connection means of the respective eye cups, means secured to the connection means of the respective eye cups for securing said tubular members to said eye cups, said means having openings therein communicating with the spaced recesses in the supporting edge portions of the eye cups and means adjacent the forward ends of the tubular members hingedly connecting said tubular members together and adjustable means connecting the eye cups together whereby the angular relation of the tubular members may be altered and the spaced relation of the eye cups may be altered, said tubular members each having magnifying means therein.

4. A device of the character described comprising a pair of eye cups formed of plastic material, each of said eye cups having an edge portion shaped to fit the face and each having a sight opening therein with connection means adjacent the sight opening, a pair of tubular members formed of plastic material hingedly connected with each other adjacent the forward ends thereof, means secured with the connection means of the eye cups for adjustably connecting the tubular members to the eye cups and means for adjustably connecting the eye cups together, said eye cups having flared portions extending outwardly of the sides thereof to provide clearance for placing the eye cups over ordinary spectacles worn by the wearer.

5. A device of the character described comprising a pair of eyecups each having an edge portion shaped to fit the face, a sight opening therein and connection means adjacent said sight opening, a pair of tubular members each having one end acutely angled with respect to its longitudinal axis and connected to the connection means of the respective eyecups with the acute angles of the respective tubular members being so disposed relative to each other as to cause the longitudinal axes of the tubular members to converge in a direction forwardly of the eyecups, the forward ends of said tubular members being hingedly connected with each other for pivotal movement about a vertically disposed axis when in position of use, lens means carried by said tubular members, said lens means being disposed in a plane acutely angled with respect to the plane of the connection means of the eyecups with their optical axes being disposed substantially in the direction of the longitudinal axes of the tubular members and distortable adjustable means connecting the eyecups and being such as to permit said eyecups to be rotated about the axes of their sight openings individually and independently of the tubular members while enabling the controlling of the distance between said eyecups according to the requirements of the wearer.

CHARLES A. ELLIS.

REFERENCES CITED

The following references are of record in the file of this patent:

UNITED STATES PATENTS

| Number | Name | Date |
|---|---|---|
| 1,892,444 | Bausch | Dec. 27, 1932 |
| 2,024,322 | Wittig | Dec. 17, 1935 |
| 988,081 | Denman | Mar. 28, 1911 |
| 1,033,965 | Troppman | July 30, 1912 |
| 2,314,838 | Kingston | Mar. 23, 1943 |
| 2,270,931 | Corcoran | Jan. 27, 1942 |
| 1,352,156 | Storn | Sept. 7, 1920 |
| 1,272,214 | Camus | July 9, 1918 |
| 1,153,259 | Seagmuller | Sept. 14, 1915 |
| 1,838,649 | Baker | Dec. 29, 1931 |
| 1,800,558 | Moran et al. | Apr. 14, 1931 |
| 1,835,534 | Steinle | Dec. 8, 1931 |
| 2,132,670 | Young, Jr. | Oct. 11, 1938 |

FOREIGN PATENTS

| Number | Country | Date |
|---|---|---|
| 277,983 | Italy | Sept. 26, 1930 |
| 150,172 | Germany | Apr. 6, 1904 |
| 38,627 | France | Mar. 24, 1931 |